Feb. 4, 1930.                M. SPILLMANN                1,745,871
                           THRUST BEARING UNIT
                           Filed Aug. 13, 1924
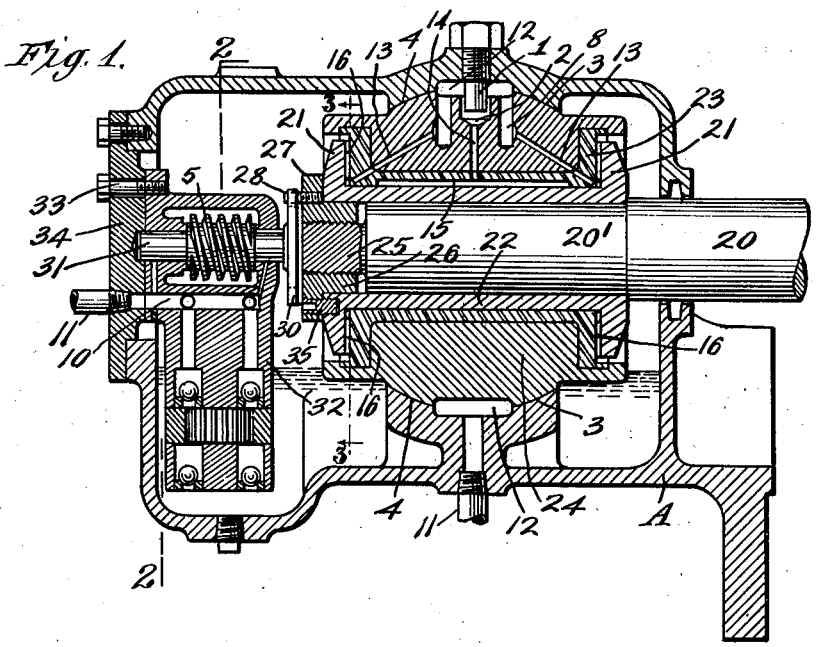
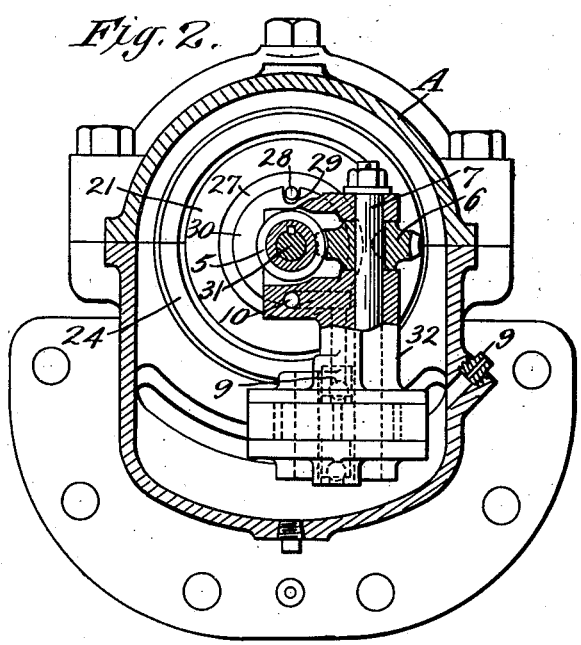
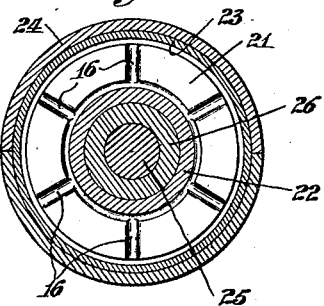
Inventor
Max Spillmann
By his Attorneys Patented Feb. 4, 1930

1,745,871

UNITED STATES PATENT OFFICE

MAX SPILLMANN, OF RICHFIELD, NEW JERSEY, ASSIGNOR TO WORTHINGTON PUMP AND MACHINERY CORPORATION, OF NEW YORK, N. Y., A CORPORATION OF VIRGINIA

THRUST-BEARING UNIT

Application filed August 13, 1924. Serial No. 731,759.

This invention relates to improvements in thrust bearings.

The invention aims especially to provide an improved thrust bearing unit of compact and comparatively simple construction, which may be readily applied to pumps and blowers, and to motors such as water turbines, steam and gas turbines, or other apparatus employing a rotating shaft in which balancing of axial shaft thrust is necessary or desirable.

In the accompanying drawings forming a part of this specification, there is shown for purpose of illustration one embodiment of the invention in a preferred form, and this construction will now be described in detail in connection with said drawings and the features forming the invention then be pointed out in the claims.

In the drawings—

Figure 1 is a vertical central section of the improved thrust bearing unit in position of use;

Figure 2 is an irregular section on the line 2—2 of Fig. 1, and

Figure 3 is a detail sectional view on the line 3—3 of Fig. 1.

Referring now to the drawings, and particularly to Fig. 1, A indicates the casing of the bearing unit, such casing preferably and as shown being divided horizontally for convenience in assembling the parts and for accessibility. The upper and lower sections of the casing may be bolted together in any suitable manner, and proper provision made for securing the bearing unit to the casing of the apparatus to which it is to be applied. Shaft 20 of a pump or other apparatus extends into the casing A and has mounted thereon thrust disks 21, preferably and as shown integrally formed with a sleeve 22 which is keyed to the shaft 20 in the usual way. The bearing surfaces of the disks 21 face each other and work against wear surfaces 23 of suitable metal mounted on an abutment 24 positioned within the casing A. For convenience in assembly, abutment 24 may be made in two parts, as shown, and when thus formed is preferably split horizontally. A pin 1, having threaded engagement with the casing A, is provided, the free end of which is arranged to have a loose fit in a hole 2 in the upper part of the abutment. The abutment, except for the wear surfaces, is preferably of approximately spherical form, the curved surfaces 3 of the hemispherical upper and lower parts being arranged to seat in correspondingly curved supports 4 within the casing, so as to hold the abutment firmly in place and yet permit it to move independently of the casing to compensate for any slight shaft misalinement or irregularity of movement. The shaft 20 is preferably turned down, as indicated at 20', to receive the sleeve 22, thus forming a shoulder against which the sleeve seats, and the shaft is shown as formed with a threaded extension 25 arranged to receive a nut 26. The nut 26 is flanged as at 27, so that screw studs 28 may be mounted on such flange for engagement with notches 29 formed in the periphery of plate 30 carried by stub shaft 31, to cause the latter to turn with shaft 23. A slip connection between the studs 28 and plate 30 is thus provided, which will enable the ready removal and application of the pumping unit hereinafter described. The bearings for the stub shaft may be formed in the pump casing 32, which, in the present case, is shown as secured to the inner side of casing A by bolts 33 taking through a removable cover-plate 34 positioned over a large opening in the casing A, the cover-plate 34 being shown as secured to the outer side of the casing by bolts in the usual manner. The provision of this large opening in casing A and the slip connection between the studs 28 and plate 30, above referred to, will enable the pump to be readily removed as a unit for inspection or repair, without interference with the bearing or such opening of the casing A as would require shutting down of the apparatus to which the bearing unit is applied. The nut 26 may be locked against movement with respect to the shaft 20 by a key 35, shown as having threaded engagement with the flange 27 and the disk 21. Worm collar 5, keyed to the stub shaft 31, is arranged to mesh with gear 6 (Fig. 2) and thus rotate shaft 7, whereby the usual gear pump construction shown will draw oil from the bottom of casing A and deliver the same to the discharge chamber 10 of the pump, and by pipe 11 carry the oil to chamber 12 surrounding the abutment 24, and communicating with the abutment seat in the casing, thus supplying oil to the bearing between the abutment and casing. Chamber 12 supplies chamber 8, and passages 13 formed in the abutment extend from the chamber 8 to the inner parts of the bearing surfaces for the thrust disks 21, while passage 14 conveys oil to chamber 15, the latter passage being arranged to receive oil from the chamber 12 due to the loose fit of the pin 1 in hole 2, with which the passage 14 communicates. It will be understood that the oil may be cooled in any well-known manner, such, for example, as by coils in the pump suction chamber or on the discharge.

From the foregoing it will be obvious that as the shaft 20 rotates, stub shaft 5 will be rotated thereby and operate the gear pump, thereby forcing lubricant into chamber 12, the pump suction being supplied from the oil in the bottom of casing A, to which oil in the proper amount may be supplied as required through an opening closed by a screw plug 9 having an air vent therein. In the preferred embodiment of the invention shown, the size of the passages 13, 14 communicating, respectively, with the thrust bearing surfaces and the oil chamber 15 for lubricating the sleeve bearing in the abutment, will be such that a constant and equal volume of oil will be supplied to each passage. Preferably this is accomplished by proportioning the passages 13 and 14 so that their combined areas will not exceed and preferably will be a little less than required for flow of all the oil pumped to chamber 12.

In Fig. 3 there is shown a preferred construction of thrust disk bearing surface with oil grooves 16, preferably and as shown radially arranged therein. These grooves should be of such size and the volume of the pump delivery such that a considerable excess of lubricant above that required for lubrication will flow constantly and freely through the grooves, such flow, of course, being accelerated beyond that produced by the pressure of the pumped liquid by the centrifugal force created by the rotation of the disks. This volume of cool oil not only serves to efficiently cool the bearing surfaces by direct contact therewith, but acts as a dirt separator, the free flow of the oil through the grooves acting to carry away in the main oil current the suspended dirt or metal particles so that they are not forced between the rubbing surfaces of the bearing. The dirt particles are thus separated and discharged into the oil reservoir in the bottom of the casing A, and a thin layer of clean oil from the sides of the grooves forced between the rubbing surfaces.

It will be understood that the invention is not to be confined to the use of a gear pump for circulating the lubricant, but that any other suitable form of pump capable of embodying the invention may be substituted therefor. It will also be understood that various changes may be made in the details of construction shown and described, while retaining the invention defined by the claims.

What is claimed is:

1. A thrust bearing unit comprising a casing, a rockable abutment in said casing and having bearing surfaces on opposite sides thereof, a shaft, thrust discs keyed to said shaft and co-acting with said abutment bearing surfaces to resist axial shaft thrust in both directions, said abutment and casing provided with an annular chamber about the circumference of the abutment and opening into a ring-like chamber at the top of the abutment, a sleeve of wear bearing metal carried by said abutment and having wear surfaces facing said thrust discs, said wear metal sleeve provided with oil ducts opening out between its wear surfaces and said disc and with an elongated lubricant groove extending longitudinally in its inner surface, said abutment provided with lubricating ducts extending from said ring-like chamber to said wear metal sleeve carried ducts and with a lubricant passage from said annular chamber to said longitudinal groove.

2. A thrust bearing unit comprising a casing, a rockable abutment in said casing and having bearing surfaces on opposite sides thereof, a shaft, thrust discs keyed to said shaft and coacting with said abutment bearing surfaces to resist axial shaft thrust in both directions, said abutment and casing provided with an annular chamber about the circumference of the abutment and opening into a ring-like chamber at the top of the abutment, a sleeve of wear bearing metal carried by said abutment and having wear surfaces facing said thrust discs, said wear metal sleeve provided with oil ducts opening out between its wear surfaces and said disc and with an elongated lubricant groove extending longitudinally in its inner surface, said abutment provided with lubricating ducts extending from said ring-like chamber to said wear metal sleeve carried ducts and with a lubricant passage from said annular chamber to said longitudinal groove, a flanged nut threaded on the end of said shaft, a lubricant pump within said casing, and a slip driving connection between said nut and pump.

In testimony whereof, I have hereunto set my hand.

MAX SPILLMANN.